(12) United States Patent
    Ro

(10) Patent No.: US 10,367,184 B2
(45) Date of Patent: Jul. 30, 2019

(54) RECHARGEABLE BATTERY

(71) Applicant: SAMSUNG SDI CO., LTD., Yongin-si, Gyeonggi-do (KR)

(72) Inventor: Dae-Sung Ro, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 53 days.

(21) Appl. No.: 15/275,582

(22) Filed: Sep. 26, 2016

(65) Prior Publication Data
    US 2017/0110763 A1      Apr. 20, 2017

(30) Foreign Application Priority Data
    Oct. 16, 2015  (KR) .................. 10-2015-0144785

(51) Int. Cl.
    *H01M 4/00*      (2006.01)
    *H01M 2/26*      (2006.01)
    *H01M 2/02*      (2006.01)
    *H01M 2/06*      (2006.01)
    *H01M 2/30*      (2006.01)
    *H01M 10/04*     (2006.01)

(52) U.S. Cl.
    CPC ......... *H01M 2/263* (2013.01); *H01M 2/0212* (2013.01); *H01M 2/0292* (2013.01); *H01M 2/06* (2013.01); *H01M 2/30* (2013.01); *H01M 10/0431* (2013.01)

(58) Field of Classification Search
    CPC .. H01M 2/263; H01M 2/0212; H01M 2/0292; H01M 2/06; H01M 2/30; H01M 10/0431
    See application file for complete search history.

(56) References Cited

U.S. PATENT DOCUMENTS

2008/0060189 A1   3/2008  Daidoji et al.
2015/0061596 A1*  3/2015  Park ................... H02J 7/0042
                                                        320/113

FOREIGN PATENT DOCUMENTS

KR   10-2006-0027249 A   3/2006
KR   10-2007-0074390 A   7/2007
KR   10-2008-0023182 A   3/2008
KR   10-2014-0110136 A   9/2014

* cited by examiner

*Primary Examiner* — Raymond Alejandro
(74) *Attorney, Agent, or Firm* — Lee & Morse, P.C.

(57) ABSTRACT

A rechargeable battery includes an electrode assembly including a first electrode, a separator, and a second electrode, a case that accommodates the electrode assembly, a first lead terminal and a second lead terminal that are respectively connected to the first electrode and the second electrode of the electrode assembly, the first and second lead terminals being drawn out of the case, and a fixing member that surrounds the first lead terminal and the second lead terminal, wherein each of the first lead terminal and the second lead terminal includes a first region and a second region on opposite sides of the fixing member, a width of the first region and a width of the second region being different.

13 Claims, 13 Drawing Sheets

RECHARGEABLE BATTERY

CROSS-REFERENCE TO RELATED APPLICATION

Korean Patent Application No. 10-2015-0144785, filed on Oct. 16, 2015, in the Korean Intellectual Property Office, and entitled: "Rechargeable Battery," is incorporated by reference herein in its entirety.

BACKGROUND

1. Field

The present disclosure relates to a rechargeable battery. More particularly, the present disclosure relates to an ultra-small rechargeable battery.

2. Description of the Related Art

With advancement of technology for mobile devices, demand for rechargeable batteries as energy sources has been increasing. A rechargeable battery differs from a primary battery in that it can be repeatedly charged and discharged, while the latter is incapable of being recharged.

One of the important factors in the manufacture of rechargeable batteries is energy density. Particularly, rechargeable batteries used in small electronic device are inserted therein to be used as a power source.

In this case, since the size of the electronic device is limited and pre-determined by its design, the volume or the capacity and form factor of the power source is fixed. Since devices associated with information technology are being down-sized, the size of a power source thereof is also becoming smaller, and thus ultra-small rechargeable batteries are being developed.

Generally, in manufacturing processes of ultra-small rechargeable batteries, a lead terminal is fusion-fixed by bonding finishing tapes by a pre-determined interval on a lead terminal shaped like a pair of metal bands and applying heat thereto. Then, a positive electrode lead terminal and a negative electrode lead terminal are formed through a separate cutting process in which the metal bands are cut according to the lengths needed. The positive electrode lead terminal and the negative electrode lead terminal are fixed on positive and negative electrode uncoated regions of an electrode assembly by welding, etc.

SUMMARY

An exemplary embodiment provides a rechargeable battery, including an electrode assembly including a first electrode, a separator, and a second electrode, a case that accommodates the electrode assembly, a first lead terminal and a second lead terminal that are respectively connected to the first electrode and the second electrode of the electrode assembly, the first and second lead terminals being drawn out of the case, and a fixing member that surrounds the first lead terminal and the second lead terminal, wherein each of the first lead terminal and the second lead terminal includes a first region and a second region on opposite sides of the fixing member, a width of the first region and a width of the second region being different.

A first distance between the first region of the first lead terminal and the first region of the second lead terminal may be different from a second distance between the second region of the first lead terminal and the second region of the second lead terminal.

At least one of the first lead terminal and the second lead terminal may be bent at a region corresponding to the fixing member.

The first lead terminal and the second lead terminal may be disposed to have a flat shape that is symmetrical with respect to a virtual vertical center line.

A width of the first region of the first lead terminal and a width of the first region of the second lead terminal may be different.

A width of the second region of the lead terminal and a width of the second region of the second lead terminal are different.

The case may be a pouch shape, and the fixing member may be fusion-bonded to the case.

The first lead terminal may include nickel or nickel/copper, and the second lead terminal may include aluminum.

Another embodiment provides a rechargeable battery, including an electrode assembly that includes a first electrode, a separator, and a second electrode; a case that accommodates the electrode assembly; a first lead terminal and a second lead terminal that are respectively connected to the first electrode and the second electrode and are drawn out of one end of the case; and a fixing member that surrounds the first lead terminal and the second lead terminal, wherein the first lead terminal and the second lead terminal may respectively include a first region and a second region that are disposed on opposite sides based on the fixing member in the center, and a first distance between the first region of the first lead terminal and the first region of the second lead terminal may be different from a second distance between the second region of the first lead terminal and the second region of the second lead terminal.

At least one of the first lead terminal and the second lead terminal may be bent at a region corresponding to the fixing member.

The first lead terminal and the second lead terminal may be disposed to have a flat shape that is symmetrical with respect to a virtual vertical center line.

A width of the first region of the first lead terminal and a width of the first region of the second lead terminal may be different.

A width of the second region of the lead terminal and a width of the second region of the second lead terminal may be different.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
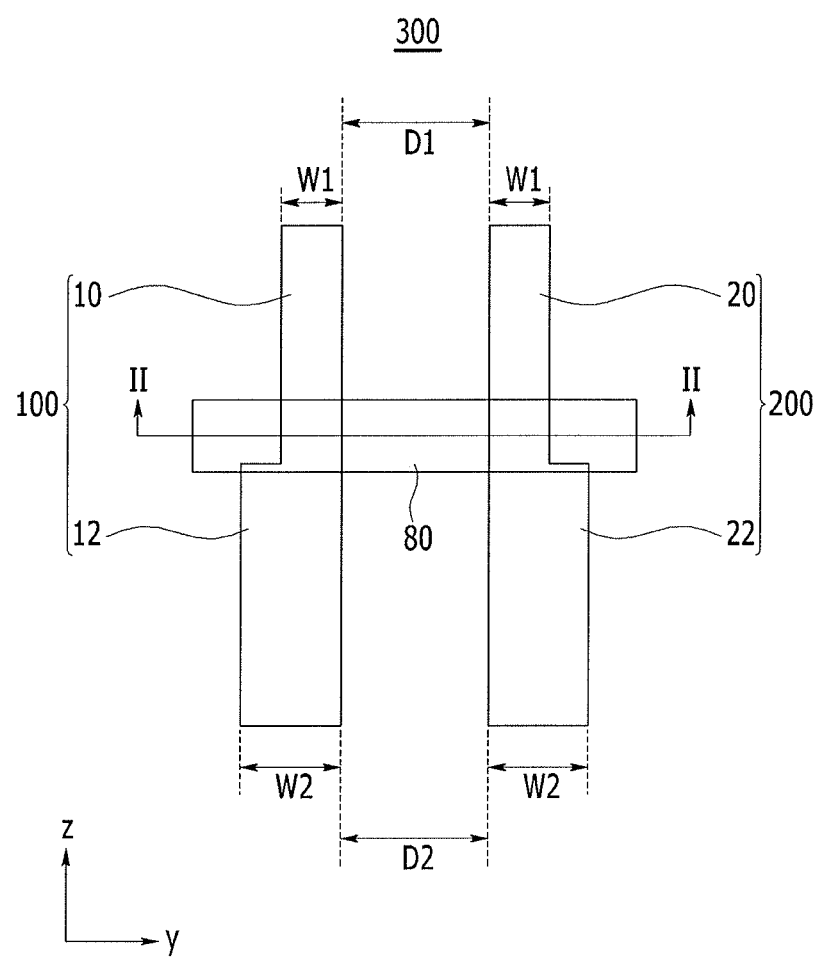
FIG. 1 illustrates a schematic top plan view of a lead terminal assembly of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, unless explicitly described to the contrary, the word "comprise" and variations such as "comprises" or "comprising" will be understood to imply the inclusion of stated elements but not the exclusion of any other elements. Further, in the specification, the word "on" means positioned above or below the object portion, and does not necessarily mean positioned on the upper side of the object portion based on a gravitational direction.

A rechargeable battery according to an exemplary embodiment will now be described with reference to the accompanying drawings.

Figure 2:
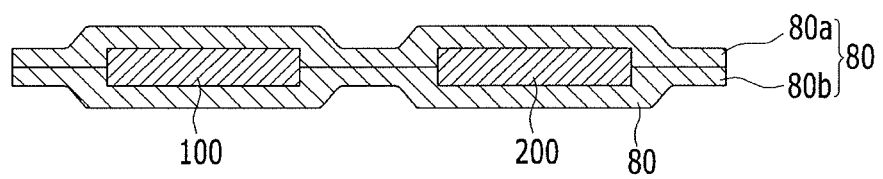
FIG. 2 illustrates a cross-sectional view of FIG. 1 taken along line II-II.

FIG. 1 illustrates a schematic top plan view of a lead terminal assembly of a rechargeable battery according to an exemplary embodiment, and FIG. 2 illustrates a cross-sectional view of FIG. 1 taken along line II-II. FIGS. 3 to 7 illustrate schematic top plan views of lead terminal assemblies of a rechargeable battery according to various exemplary embodiments.

As shown in FIGS. 1 and 2, a lead terminal assembly 300 may include a first lead terminal 100, a second lead terminal 200, and a fixing member 80 which fixes the first lead terminal 100 and the second lead terminal 200. For example, as illustrated in FIG. 2, the fixing member 80 may extend continuously to surround and contact each of the first lead terminal 100 and the second lead terminal 200.

The fixing member 80 fixes together the first lead terminal 100 and the second lead terminal 200. For example, as illustrated in FIG. 2, the fixing member 80 may include a first member 80a and a second member 80b, so each of the first and second lead terminals 100 and 200 may be disposed between the first and second members 80a and 80b. For example, the first and second members 80a and 80b may be an upper member disposed above the lead terminal and a lower member disposed below the lead terminal, respectively, so the first and second lead terminals 100 and 200 may be disposed between each of the upper and lower members and thermos-bonded to be fixed.

The first lead terminal 100 and the second lead terminal 200 may be formed of conductive metal. For example, the first lead terminal 100 may include nickel (Ni) or nickel (Ni)/copper (Cu), and the second lead terminal 200 may include aluminum (Al).

The first lead terminal 100 and the second lead terminal 200 may have the same, e.g., flat, shape and may be symmetrical with respect to a virtual vertical center line therebetween. The first lead terminal 100 and the second lead terminal 200 are respectively connected to opposite polarity electrodes, thus are disposed to be separated by a predetermined distance.

Figure 12:
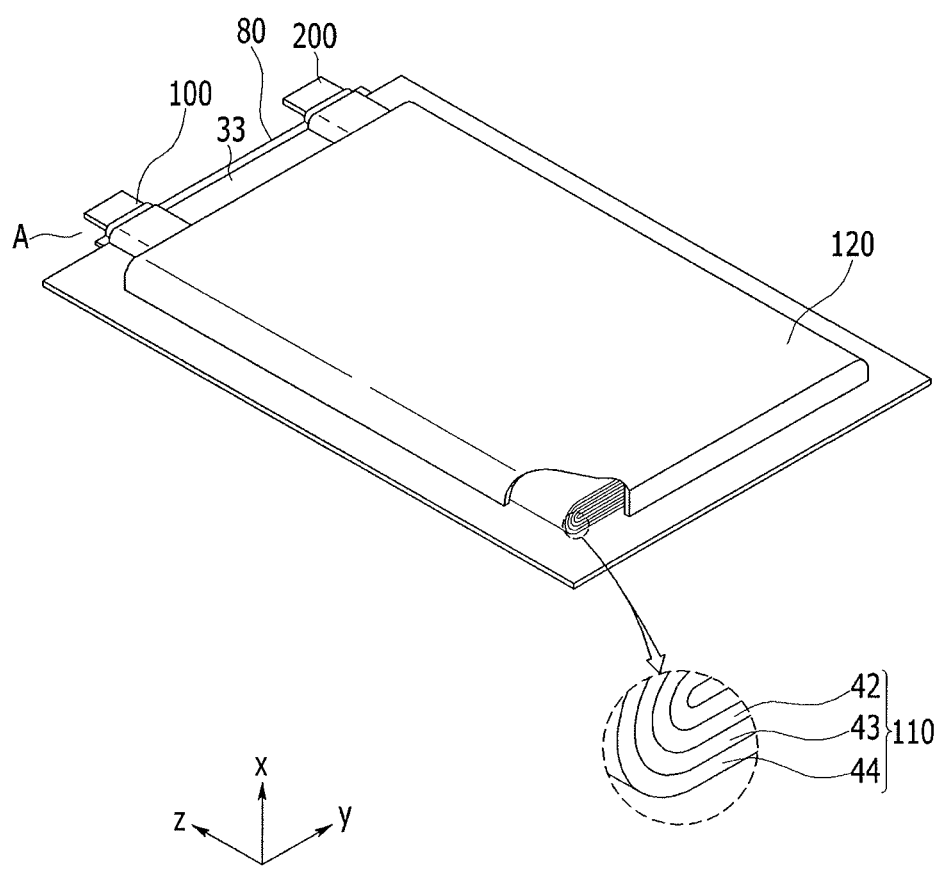
FIG. 12 illustrates a perspective view of a rechargeable battery which includes the electrode assembly of FIG. 11.

The first lead terminal 100 and the second lead terminal 200 respectively include first parts 10 and 20 and second parts 12 and 22 which are respectively disposed at opposite sides of the fixing member 80. For example, as illustrated in FIG. 1, the first lead terminal 100 may include first and second parts 10 and 12 at opposite sides of the fixing member 80, e.g., opposite sides along the z-axis, and the second lead terminal 200 may include first and second parts 20 and 22 at opposite sides of the fixing member 80. For example, as illustrated in FIG. 12, the second parts 12 and 22 of the first and second lead terminals 100 and 200 may be connected to respective electrodes of an electrode assembly, while the first parts 10 and 20 of the first and second lead terminals 100 and 200 may extend to the outside to be connected to an external device.

Figure 3:
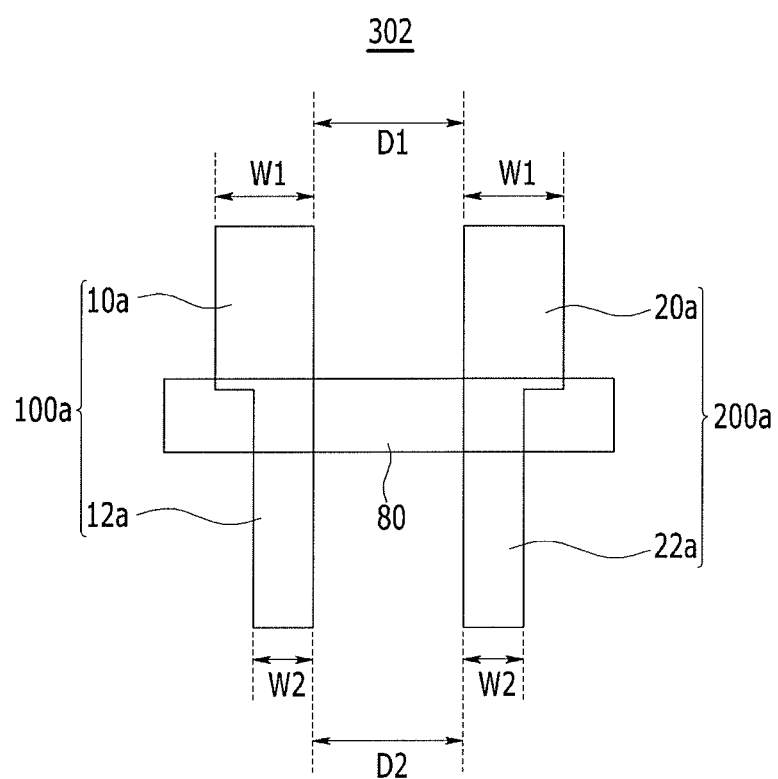
FIGS. 3 to 9 illustrate schematic top plan views of lead terminal assemblies of a rechargeable battery according to various exemplary embodiments.

As illustrated in FIG. 1, widths of the first and second lead terminals 100 and 200 may be non-uniform along the z-axis. For example, widths W1 of the first parts 10 and 20, e.g., along the y-axis, may be narrower than widths W2 of the second parts 12 and 22. In another example, as illustrated in FIG. 3, the widths W1 of first parts 10a and 20a of first and second lead terminals 100a and 200a in a lead terminal assembly 302 may be wider than the widths W2 of the second parts 12a and 22a.

For example, a distance D1 between the first parts 10 and 20, e.g., along the y-axis, of the first lead terminal 100 and the second lead terminal 200 may equal a distance D2 between the second parts 12 and 22 of the first lead terminal 100 and the second lead terminal 200, but embodiments are not limited thereto, and the D1 and D2 may be formed to have different distances. That is, in another example illustrated in FIGS. 4 and 5, lead terminal assemblies 304 and 306 may include a first distance D1 between a first part 10b of a first lead terminal 100b and a first part 20b of a second lead terminal 200b that is different from a second distance D2 between a second part 12b of the first lead terminal 100b and a second part 22b of the second lead terminal 200b.

Figure 4:
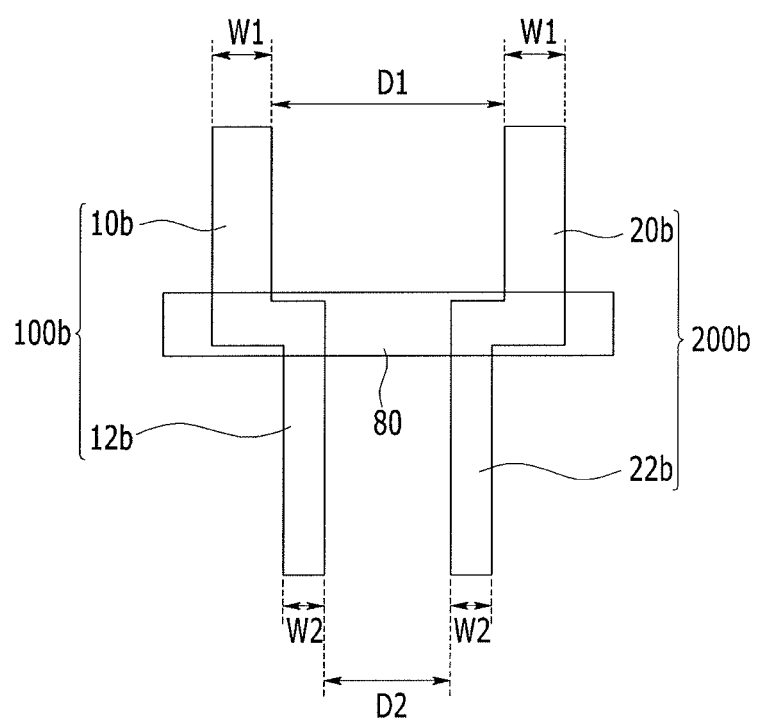
Figure 5:
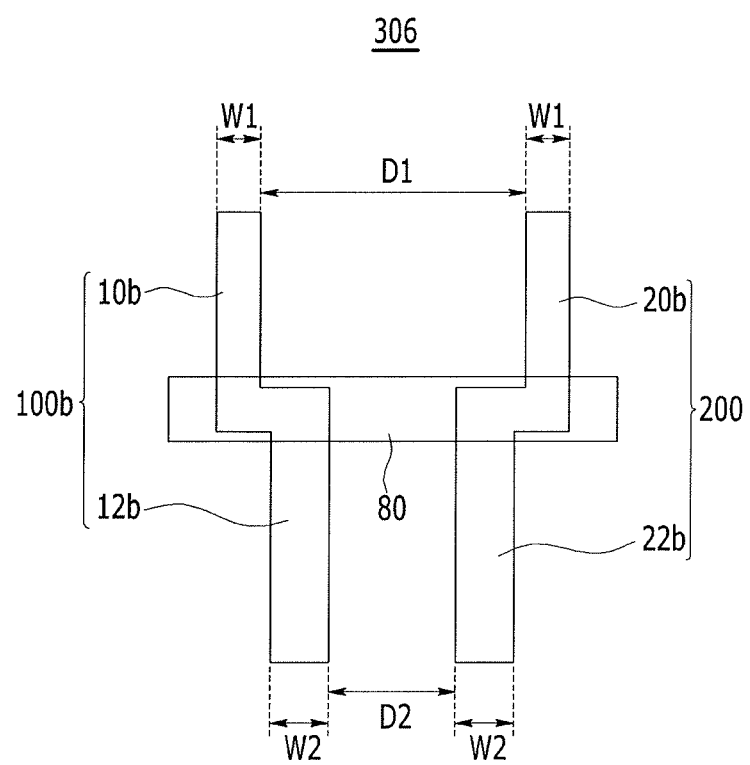

For example, as shown in FIGS. 4-5, in the lead terminal assemblies 304 and 306, the first distance D1 between the first parts 10b/20b may be wider than the second distance D2 between the second parts 12b/22b. Further, as shown in FIGS. 4-5, the width W1 of the first part and the width W2 of the second part may be different, but are not limited thereto.

Although the above-described exemplary embodiments illustrate lead terminal assemblies in which the first lead terminal and the second lead terminal have the same flat shape. However, embodiments are not limited thereto, e.g., the first and second lead terminals may have different shapes.

Figure 6:
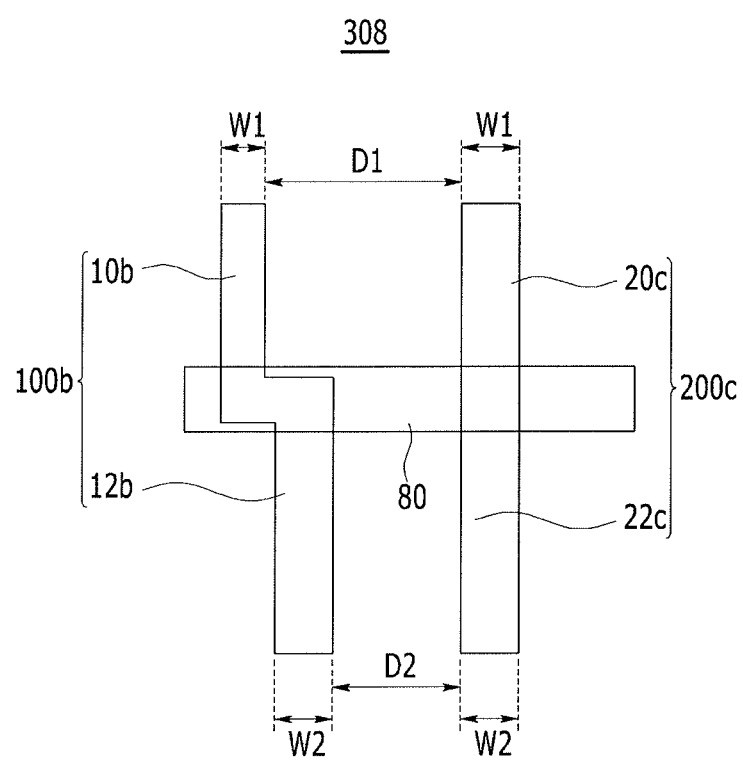

As shown in FIG. 6, in a lead terminal assembly 308, the first part 10b and the second part 12b of the first lead terminal 100b are respectively disposed at opposite sides based on the fixing member 80, and the width W1 of the first part 10b is different, e.g., smaller, from the width W2 of the second part 12b. The width W1 of a first part 20c of a second lead terminal 200c may be identical to the width W2 of a second part 22c thereof.

Figure 7:
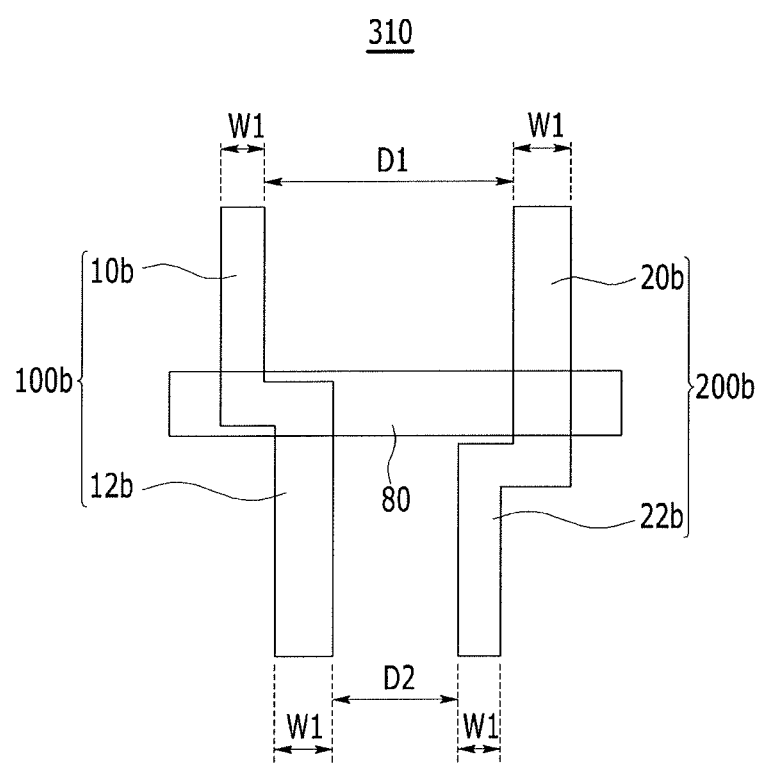

Further, as shown in FIG. 7, in a lead terminal assembly 310, a width W1 of the first part 10b of the first lead terminal 100b may be narrower than a width W2 of the second part 12b thereof. A width W1 of the first part 20b of the second lead terminal 200b may be wider than the width W2 of the second part 22b thereof.

In the lead terminal assemblies according to the above-described exemplary embodiments, by performing welding in an area with a relatively widened width thereof, a process margin may increase. In detail, after disposing portions to be welded in the area with the relatively wide width between lead terminals to minimize interference between neighboring lead terminals and by performing the welding, welding defects may be minimized.

In other words, by using lead terminal assemblies in which the area to be welded is increased, as shown in FIGS. 1 and 3, a process margin may increase and welding defects may be minimized. Further, by performing the welding in lead terminal assemblies in which the distance between neighboring terminals is increased as shown in FIGS. 4 and 5, an interference and a short-circuit between neighboring terminals may be prevented during the welding. As such, by selectively welding the lead terminal assemblies according to exemplary embodiments considering portions where welding defects may occur, the welding defects may be minimized during welding.

A lead terminal assembly may be formed as a structure in which a plurality of unit terminal assemblies are sequentially connected in plural, as will be discussed in detail below with reference to FIGS. 8-10.

Figure 8:
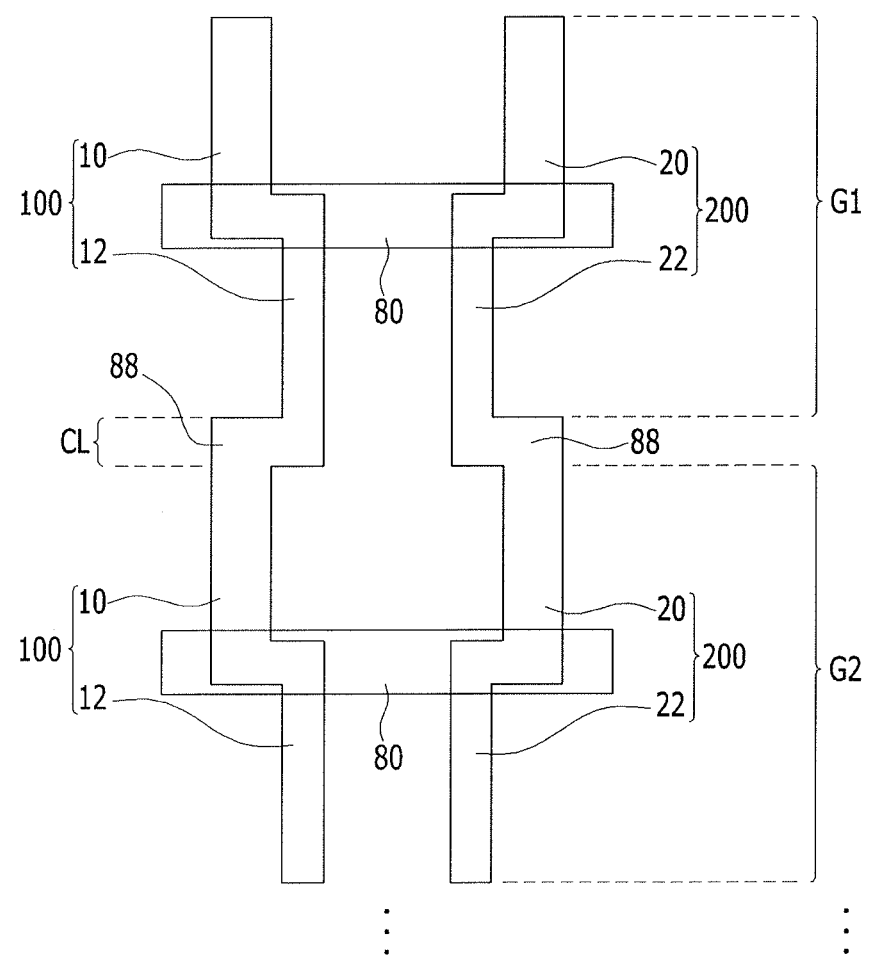
Figure 9:
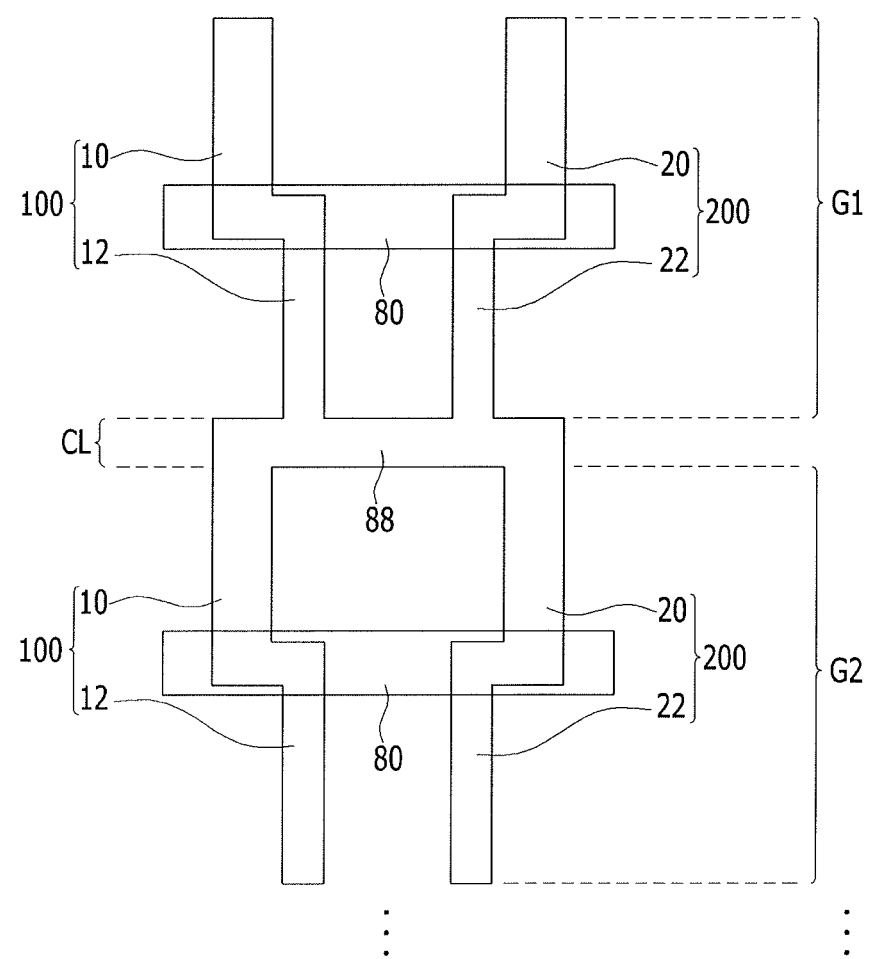
Figure 10:
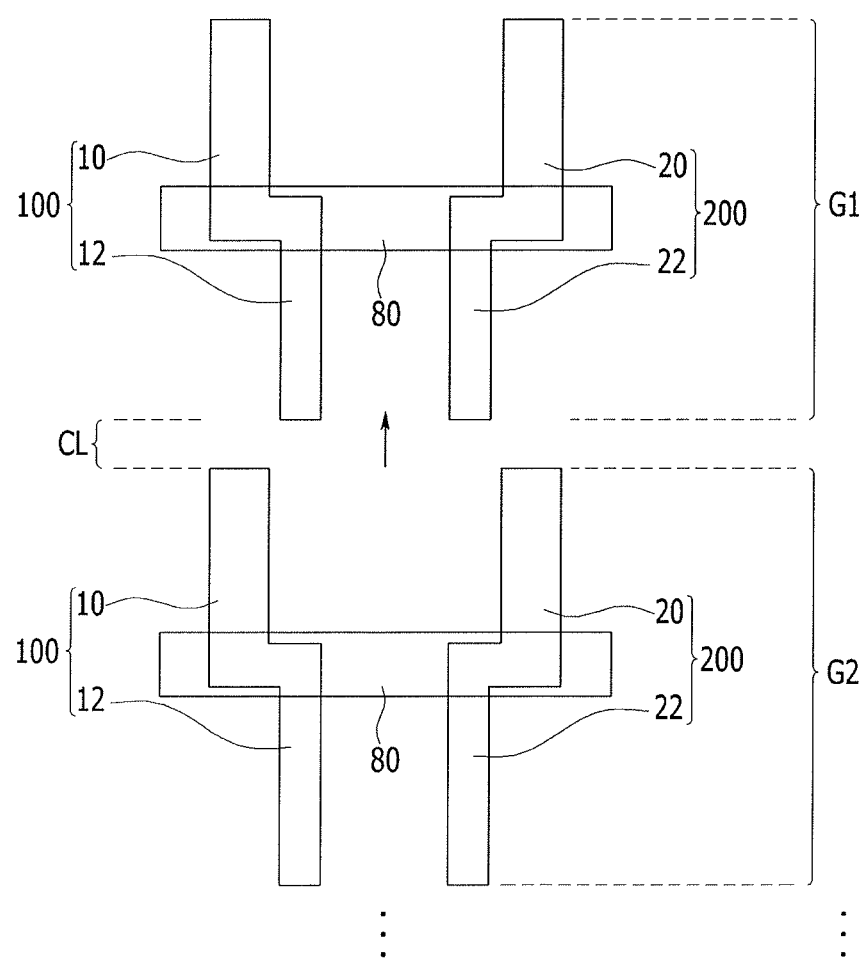
FIG. 10 illustrates a top plan view of a middle phase of a welding process of a lead terminal assembly according to an exemplary embodiment.

FIGS. 8 and 9 illustrate schematic top plan views of lead terminal assemblies of a rechargeable battery according to various exemplary embodiments. FIG. 10 illustrates a top plan view of a middle phase of a welding process of a lead terminal assembly according to an exemplary embodiment.

As shown in FIG. 8, a lead terminal assembly according to another exemplary embodiment may include a plurality of unit terminals G1 and G2.

FIG. 8 refers to the lead terminal illustrated in FIG. 1 as an example. However, the present disclosure is not limited thereto, and the lead terminals illustrated in FIGS. 3 to 7 may be connected as a unit terminal. FIG. 8 illustrates that two unit terminals are connected as an example, but the present disclosure is not limited thereto, e.g., three or more unit terminals may be connected. Hereinafter, for better understanding and ease of description, the two unit terminals will be referred to as a first unit terminal and a second unit terminal in the connected order.

As shown in FIG. 8, each of the first unit terminal G1 and the second unit terminal G2 may include the first lead terminal 100 and the second lead terminal 200 that are disposed to be spaced apart from each other. The first lead terminal 100 and the second lead terminal 200 are fixed by a fixing member 80.

Meanwhile, a connecting member 88 may be disposed between respective unit terminals, and the connecting member 88 connects the first and second unit terminals G1 and G2 which are disposed at opposite sides of the connecting member 88. For example, the connecting member 88 connects the first unit terminal G1 and the second unit terminal G2, and connects the second unit terminal G1 and a third unit terminal.

The first lead terminal 100 and the connecting member 88 may be integrally formed, and the second lead terminal 200 and the connecting member 88 may also be integrally formed.

In FIG. 8, the connecting member 88 is respectively formed between the adjacent first lead terminals 100 and between the adjacent second lead terminals 200, but the present disclosure is not limited thereto. For example, as shown in FIG. 9, the connecting member 88 may be formed to have a structure which connects the first lead terminal 100 and the second lead terminal 200. In this case, a plurality of first and second lead terminals 100 and 200, and the connecting member 88 may be integrally formed.

As shown in FIGS. 8 and 9, by connecting the plurality of unit terminals G1 and G2, it is possible to produce a lead electrode assembly in a type of a reel. Therefore, the welding process may be repeated continuously and consecutively.

For example, when the first unit terminal G1 is welded to the rechargeable battery, the first and second lead terminals of the first unit terminal G1 are each welded to positive and negative uncoated regions (or positive and negative taps) of the rechargeable battery. Then, a cutting area CL is removed so that the second unit terminal G2 is separated from the first unit terminal G1. The cutting area CL may be an area where the connecting member 88 is formed. Next, as in the first unit terminal G1, the second unit terminal G2 is welded to the positive and negative electrode uncoated regions of the rechargeable battery and then is separated.

The connecting member 88 may be entirely removed during the cutting process. The cutting process may be performed by laser-irradiating or with a cutting-knife, and a width of the laser beam or the shearing knife may be equal to that of the connecting member 88 in order to cut easily the lead electrode assembly into each unit member.

In the above-described exemplary embodiment, the connecting member is removed and then the unit terminal is separated after the welding process, but the present disclosure is not limited thereto. For example, the welding process may be performed after the first unit terminal G1 is separated from the second unit terminal G2.

A rechargeable battery which includes the above-described lead terminal assembly will now be described with reference to the accompanying drawings.

Figure 11:
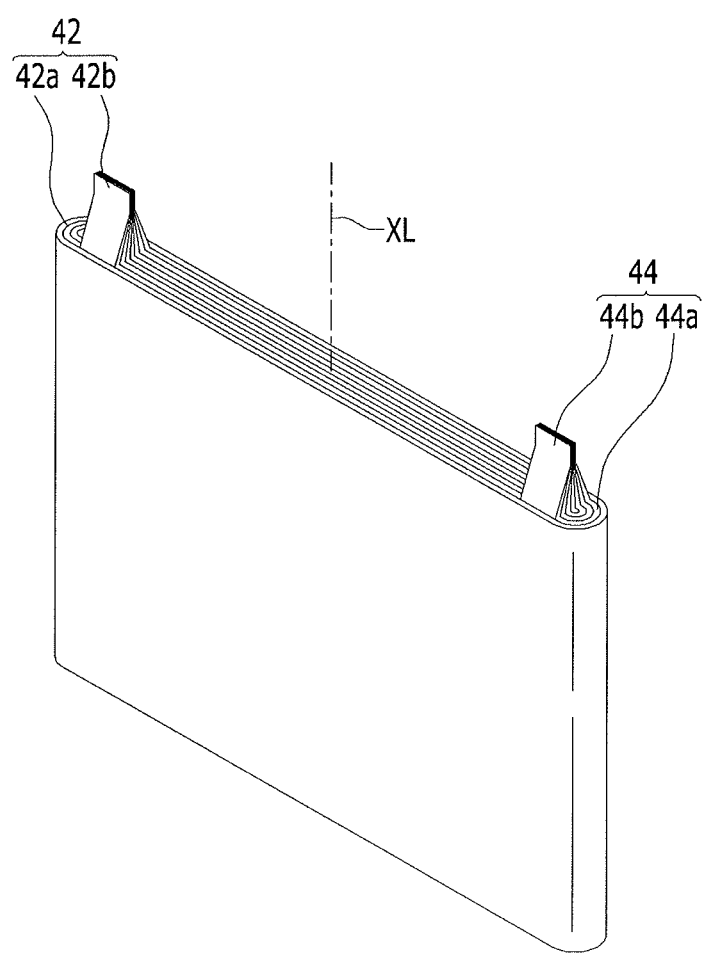
FIG. 11 illustrates a perspective view of an electrode assembly of a rechargeable battery according to an exemplary embodiment.
Figure 13:
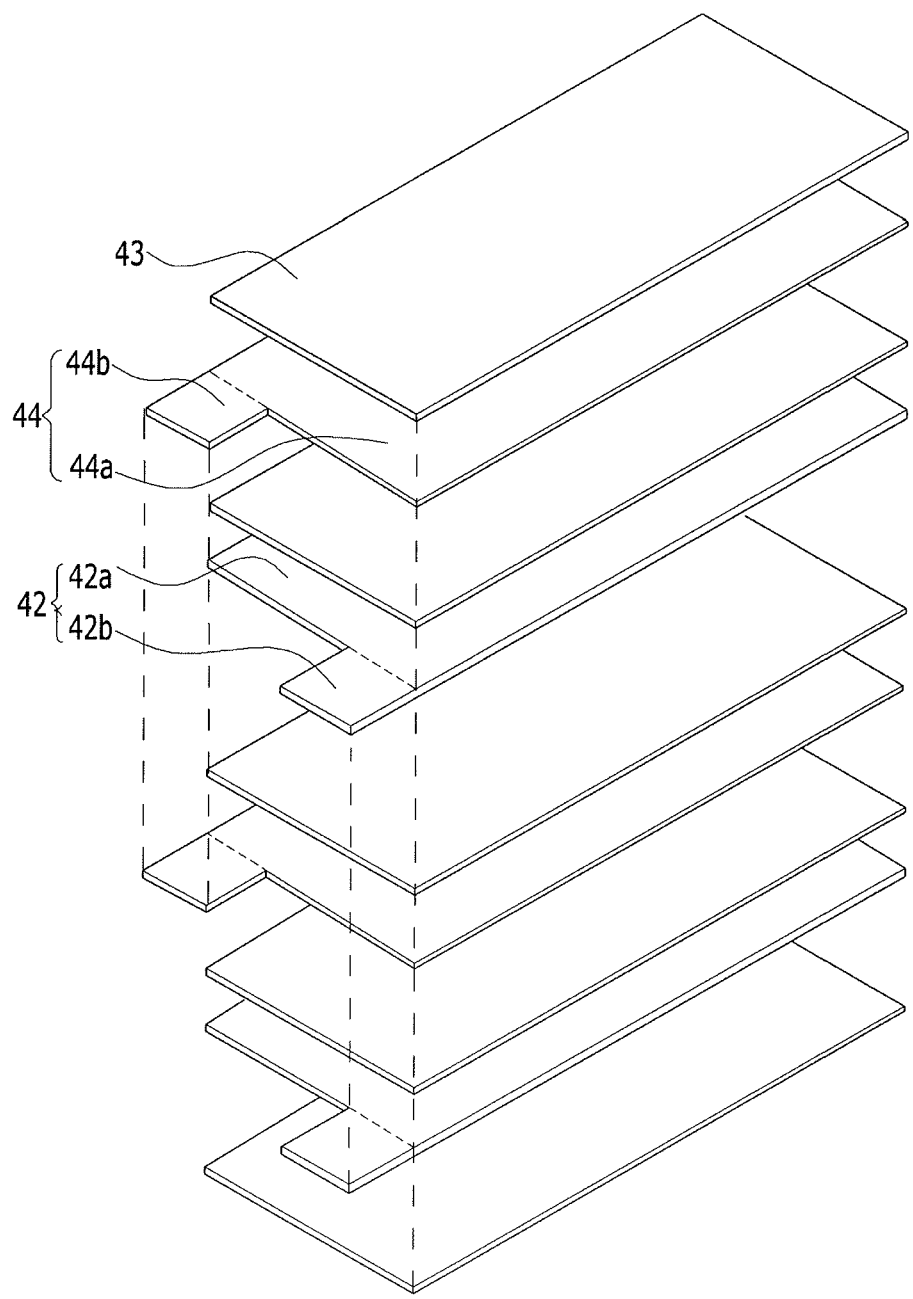
FIG. 13 illustrates an exploded perspective view of an electrode assembly of a rechargeable battery according to another exemplary embodiment.

FIG. 11 illustrates a perspective view of an electrode assembly of a rechargeable battery according to an exemplary embodiment, and FIG. 12 illustrates a perspective view of a rechargeable battery which includes the electrode assembly of FIG. 11. FIG. 13 illustrates an exploded perspective view of an electrode assembly of a rechargeable battery according to another exemplary embodiment.

As shown in FIGS. 11 and 12, a rechargeable battery may include an electrode assembly 110, a case (hereinafter referred to as a pouch 120) in which the electrode assembly 110 is embedded, and a lead electrode assembly which is connected to the electrode assembly 110 and is drawn out of the pouch 120.

The electrode assembly 110 may include a first electrode 42, a second electrode 44, and a separator 43 which is disposed between the first electrode 42 and the second electrode 44. Since the separator 43 is for insulation, the first electrode 42, a first separator 43, the second electrode 44, and a second separator 43 may be sequentially stacked.

For example, the electrode assembly 110 may have a jelly roll shape in which the stacked first electrode 42, first separator 43, second electrode 44, and second separator 43 are spirally wound based on a winding axis. As needed, the electrode assembly 110 may be pressurized to be flat after being spirally wound, and it may have a shape with an oval cross-section.

Each of the first electrode 42 and the second electrode 44 may include a first electrode plate 42a and a second electrode plate 44a, i.e., where an active material is coated on a thin plate formed of a band-shaped metal foil, and a first electrode uncoated region 42b and a second electrode uncoated region 44b, i.e., where the active material is not coated. Each of the first electrode uncoated region 42b and the second electrode uncoated region 44b can be formed at a predetermined interval along a side of each of the first electrode plate 42a and the second electrode plate 44a, and be spirally wound based on the winding axis XL, such that a plurality of electrode uncoated regions may be overlapped. The plurality of electrode uncoated regions may be welded by ultrasonic welding, etc. The first electrode uncoated region 42b and the second electrode uncoated region 44b are disposed to not be short-circuited.

For example, the first electrode 42 may be a positive electrode of the rechargeable battery, and in the first electrode plate 42a, an active material, e.g., transition metal oxide, may be coated on a metal foil formed of, e.g., aluminum. Further, the second electrode 44 may be a negative electrode of the rechargeable battery, and in the second electrode plate 44a, an active material, e.g., graphite or carbon, may be coated on a metal foil formed of, e.g., copper or nickel. The separator 43 is formed of a porous material, and may be formed of, e.g., polyolefin, polyethylene, polypropylene, etc.

The electrode assembly 110 may be inserted into the pouch 120 with an electrolyte and then sealed. The electrolyte solution may include organic solvent, e.g., EC, PC, DEC, EMC, and EMC, and lithium salt, e.g., $LiPF_6$ and $LiBF_4$. The electrolyte solution may be in liquid, solid, or gel form.

In another example, as shown in FIG. 13, the electrode assembly 110 may have a structure in which a sheet-type of the first electrode 42, the separator 43, and the second electrode 44 are repeatedly stacked.

The electrode plate 42a of the first electrode 42 and the second electrode plate 44a of the second electrode 44 may face each other with the separator 43 therebetween, and the first uncoated electrode region 42b and the second uncoated electrode region 44b may be spaced apart from each other. In this case, a cross-section of the electrode assembly may approximately be a quadrangle.

Referring back to FIGS. 11 and 12, the first lead terminal 100 of the lead terminal assembly is electrically connected to the first electrode uncoated region 42b, and the second lead terminal 200 is electrically connected to the second electrode uncoated region 44b. In this case, the first lead terminal 100 and the second lead terminal 200 can each be combined to the first electrode uncoated region 42b and the second electrode uncoated region 44b by welding. In this case, the first areas with the relatively widened width in the first lead terminal 100 and the second lead terminal 200 are welded to the first electrode uncoated region 42b and the second electrode uncoated region 44b.

The pouch 120 can be selected to have a prismatic shape or a pouch shape as necessary, and hereinafter, the pouch shape will be exemplarily described. The pouch 120 may be formed of a multi-layered sheet structure. For example, the pouch 120 may include a polymer sheet which forms an inner side and performs insulating and thermos-bonding functions, a PET (polyethylene terephthalate) sheet which forms an outer side and performs a protecting function, a nylon sheet or a PET-nylon composite sheet, and a metal sheet which provides mechanical strength. For example, the metal sheet may be an aluminum sheet and is disposed between the polymer sheet and the nylon sheet.

The pouch 120 is disposed at a receptor 33. That is, the electrode assembly 110 is inserted into the pouch 120, and the pouch 120 is accommodated in the receptor 33. The receptor 33 includes an edge portion, e.g., surrounding the pouch 120, which is fusion-bonded thereto for sealing.

It has been described in the above-described embodiment that the first region of the lead terminal with the relatively widened width is welded to the electrode uncoated region, but the present disclosure is not limited thereto. For example, as shown in FIGS. 4 and 5, it is possible to position a region where the distance between the lead terminals is relatively wide inside the pouch to be connected to the electrode uncoated region.

As such, when fixing the lead terminal assembly to the electrode uncoated region by welding, it is possible to reduce the welding defects by welding the relatively widened region to the electrode uncoated region according to the exemplary embodiment. Further, it is possible to reduce the welding defects by welding the region where the distance between the lead terminals is relatively wide to the electrode uncoated region. In this case, the distance between the first electrode uncoated region and the second electrode uncoated region may increase by the same distance as that between lead terminals.

It has been described in the above-described exemplary embodiment that the region of the lead terminal assembly with the relatively widened width is welded and bonded to the electrode assembly, but the present disclosure is not limited thereto. For example, when the welding defects increase during a welding process for connecting with an external device, it is possible to position the region with the relatively widened width or the region in which the distance between the lead terminals is wide at the outside of the pouch to be able to be welded to a terminal of the external device.

By way of summation and review, when an electrode assembly is used in an ultra-small rechargeable battery, the positive electrode uncoated region and the negative electrode uncoated region may be insufficiently separated apart from each other to effectively perform welding. In such an ultra-small rechargeable battery, when a lead terminal is welded to an uncoated region, welding defects and a short-circuit may occur.

In contrast, the present disclosure provides a rechargeable battery in which a lead terminal and an uncoated region are easily welded while preventing a short-circuit and the like from occurring even in an ultra-small rechargeable battery. That is, according to embodiments, a lead terminal assembly may have an increased width of the region to be welded and an increased distance between neighboring terminals, thereby easily performing the welding process and preventing the welding defects.

In other words, it is possible to provide a rechargeable battery in which a short-circuit does not occur during a welding process of a ultra-small rechargeable battery by varying a distance between a positive electrode lead terminal and a negative electrode lead terminal in accordance with their locations. Furthermore, by varying the width of the lead terminals in accordance with their locations, it is possible to provide a rechargeable battery in which welding defects do not occur.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly including a first electrode, a separator, and a second electrode;
a case that accommodates the electrode assembly;
a first lead terminal and a second lead terminal that are respectively connected to the first electrode and the second electrode of the electrode assembly, the first and second lead terminals being drawn out of the case; and
a fixing member that surrounds the first lead terminal and the second lead terminal,
wherein the first lead terminal includes a first region and a second region adjacent to each other along a first direction, longitudinal directions of each of the entire first and second regions extending entirely along the first direction from opposite sides of the fixing member,
wherein the second lead terminal includes a third region and a fourth region adjacent to each other along the first direction, longitudinal directions of each of the entire third and fourth regions extending entirely along the first direction from opposite sides of the fixing member, and
wherein a width of the first region and a width of the second region are different from each other along a second direction perpendicular to the first direction, and a width of the third region and a width of the fourth region are different from each other along the second direction.

2. The rechargeable battery as claimed in claim 1, wherein a first distance between the first region of the first lead terminal and the third region of the second lead terminal is different from a second distance between the second region of the first lead terminal and the fourth region of the second lead terminal.

3. The rechargeable battery as claimed in claim 2, wherein at least one of the first lead terminal and the second lead terminal is bent at a region corresponding to the fixing member.

4. The rechargeable battery as claimed in claim 2, wherein the first lead terminal and the second lead terminal have a flat shape, the first and second lead terminals being symmetrical with respect to an imaginary vertical line extending along the first direction between the first and second lead terminals.

5. The rechargeable battery as claimed in claim 1, wherein a width of the first region of the first lead terminal and a width of the third region of the second lead terminal are different.

6. The rechargeable battery as claimed in claim 1, wherein a width of the second region of the first lead terminal and a width of the fourth region of the second lead terminal are different.

7. The rechargeable battery as claimed in claim 1, wherein the case has a pouch shape, and the fixing member is fusion-bonded to the case.

8. The rechargeable battery as claimed in claim 1, wherein the first lead terminal includes nickel or nickel/copper, and the second lead terminal includes aluminum.

9. The rechargeable battery as claimed in claim 1, wherein the first and second regions are continuous with each other along the first direction, and the third and fourth regions are continuous with each other along the first direction.

10. The rechargeable battery as claimed in claim 9, wherein the first and second regions are integral with each other to define a single first lead terminal, and the third and fourth regions are integral with each other to define a single second lead terminal.

11. The rechargeable battery as claimed in claim 1, wherein the fixing member continuously surrounds a boundary region of the first and second regions and a boundary region of the third and fourth regions, the fixing member overlapping a portion of each of the first through fourth regions.

12. The rechargeable battery as claimed in claim 11, wherein the fixing member extends along the second direction to overlap opposite surfaces of each of the first through fourth regions.

13. The rechargeable battery as claimed in claim 1, wherein the fixing member is external with respect to the case, only the first and third regions among the first through fourth regions extending away from the fixing member in a direction oriented away from the case.

* * * * *